(12) United States Patent
Hasegawa et al.

(10) Patent No.: US 10,268,489 B2
(45) Date of Patent: Apr. 23, 2019

(54) ADAPTIVE SUCCESSIVE WARNING MESSAGE HANDLING

(71) Applicant: INTERNATIONAL BUSINESS MACHINES CORPORATION, Armonk, NY (US)

(72) Inventors: Tohru Hasegawa, Tokyo (JP); Yuhko Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 15/270,082

(22) Filed: Sep. 20, 2016

(65) Prior Publication Data

US 2018/0081700 A1   Mar. 22, 2018

(51) Int. Cl.
*G06F 9/451* (2018.01)

(52) U.S. Cl.
CPC .................. *G06F 9/451* (2018.02)

(58) Field of Classification Search
CPC combination set(s) only.
See application file for complete search history.

(56) References Cited

U.S. PATENT DOCUMENTS

| 6,853,390 | B1  |         | 2/2005  | Wandersleben et al. |
|-----------|-----|---------|---------|---------------------|
| 7,209,955 | B1  | *       | 4/2007  | Major ............... G06F 17/30867 340/7.29 |
| 7,408,458 | B1  | *       | 8/2008  | Sheleheda ............ G08B 25/001 340/506 |
| 7,594,186 | B2  |         | 9/2009  | Bates et al. |
| 7,624,172 | B1  | *       | 11/2009 | Austin-Lane .......... G06Q 30/02 709/203 |
| 8,893,033 | B2  | *       | 11/2014 | Donahue ............. G06F 3/04817 715/764 |
| 9,071,464 | B2  | *       | 6/2015  | Jacovi ................... H04L 12/587 |
| 9,736,209 | B2  | *       | 8/2017  | Austin-Lane ........... H04L 67/02 |
| 9,742,915 | B1  | *       | 8/2017  | Daddi ................. H04M 3/5175 |
| 2001/0001552 | A1 | *   | 5/2001  | Vong ...................... G04G 11/00 340/691.1 |
| 2005/0223069 | A1 | *   | 10/2005 | Cooperman ......... G06Q 10/107 709/206 |
| 2008/0132290 | A1 | *   | 6/2008  | Sharabi ............. H04M 1/72519 455/567 |
| 2010/0251168 | A1 |         | 9/2010  | Fujita et al. |
| 2010/0281409 | A1 | *   | 11/2010 | Rainisto .................. G06F 9/451 715/767 |

(Continued)

FOREIGN PATENT DOCUMENTS

WO    2012079779 A1    6/2012

OTHER PUBLICATIONS

Delay MessageBox with auto-close option by Shog et al. (Wayback archive Jul. 2012, pp. 1-13) (Year: 2012).*

*Primary Examiner* — Hien L Duong
(74) *Attorney, Agent, or Firm* — Dmitry Paskalov (57) ABSTRACT

A computer receives a plurality of warning messages. The computer determines that a first warning message of the plurality of warning messages was not previously displayed based on determining the first warning message does not match a warning message contained in a previous warning message list. The computer displays the first warning message without an active User Interface (UI) object based on determining that the first warning message was not previously displayed. The computer presents an active UI object after a delay time.

15 Claims, 3 Drawing Sheets

(56) References Cited

U.S. PATENT DOCUMENTS

| | | | |
|---|---|---|---|
| 2012/0007737 A1* | 1/2012 | Kangas | H04M 19/04 340/540 |
| 2012/0218578 A1* | 8/2012 | Tanaka | G03G 15/5075 358/1.13 |
| 2013/0007665 A1* | 1/2013 | Chaudhri | H04L 51/24 715/830 |
| 2013/0106749 A1 | 5/2013 | Hosono et al. | |
| 2013/0144971 A1* | 6/2013 | Austin-Lane | H04L 67/02 709/217 |
| 2014/0032694 A1* | 1/2014 | Cohn | G06F 11/3072 709/207 |
| 2014/0181242 A1* | 6/2014 | Church | H04L 67/02 709/217 |
| 2014/0201675 A1* | 7/2014 | Joo | G06F 3/0481 715/784 |
| 2015/0133199 A1* | 5/2015 | Lee | G06Q 30/0241 455/566 |
| 2016/0239165 A1* | 8/2016 | Chen | G06F 3/04847 |
| 2017/0078235 A1* | 3/2017 | Cannata | G06Q 10/107 |
| 2017/0126608 A1* | 5/2017 | Friend | H04L 51/22 |
| 2017/0277361 A1* | 9/2017 | Schulze | G06F 9/451 |
| 2018/0006973 A1* | 1/2018 | Hays | H04L 51/02 |

\* cited by examiner

ADAPTIVE SUCCESSIVE WARNING MESSAGE HANDLING

BACKGROUND

The present invention relates generally to a field of user interfaces (UI), and more particularly to improving a user interface that displays successive warning messages. A warning message is a discrete unit of communication transmitted by a source for consumption by an intended recipient. In a digital systems environment, a warning message is typically an open dialog box that is presented to a user on a display of a computing device.

Typically, a UI of a computing device incorporates warning message handling and warning message displaying elements to communicate important information to a user. Warning message displaying elements are software objects that are incorporated in a UI and allow displaying of important information such as warnings, errors, or other warning messages on a display of the computing device. Warning messages that are displayed on a computing device can be closed only by specified, pre-determined user input. The user input can be for example, an OK button at the end of the warning message box that a user can interact with by using a pointing device (press the button).

SUMMARY

Embodiments of the present invention provide a system, method, and program product for an adaptive successive warning message handling. A computer receives a plurality of warning messages. The computer determines that a first warning message of the plurality of warning messages was not previously displayed based on determining the first warning message does not match a warning message contained in a previous warning message list. The computer displays the first warning message without an active User Interface (UI) object based on determining that the first warning message was not previously displayed. The computer presents an active UI object after a delay time.

DETAILED DESCRIPTION

Displaying warning messages on a computing device is an important capability for any User Interface (UI). Since warning messages convey important information to a user, typically whenever a warning message is displayed other UI functionality is temporarily suspended until either the user accepts that the warning message was read by interacting with a Graphic User Interface object or the warning message closes automatically after a pre-determined delay in time.

In certain circumstances, a warning message includes a Graphic User Interface (GUI) object ("GUI object") that the user can interact with in order to close the warning message. The GUI object can be, for example, an OK button displayed at the end of the warning message, an X button displayed at the corner of the warning message box, or a NEXT button.

Users can interact with GUI objects by using a pointing device, keypad or other device that can receive user input associated with the GUI objects. Pointing device can be a finger that touches a touch sensitive screen, a mouse, an eye movement detector, a voice recognition detector capable of receiving user verbal commands, or any other body movement detector that is capable to translate a body movement to a command.

Whenever several warning messages are generated or received, the UI organizes and displays the warning messages on the screen. When a computing device display has a high resolution that allows display of all the warning messages, all of the warning messages are displayed simultaneously on the screen. However, in instances where the display resolution is low, the UI displays one warning message at a time. In order to avoid requiring the user to scroll the screen with a pointing device to view or read the warning messages, the GUI can present the warning messages one after another on the display, in successive order.

Displaying the warning messages in successive order, using a confirming input from the user to progress to a subsequent warning message, causes the user to repeat the same confirming input to view multiple warning messages, which can lead to skipping some of the successive warning messages unintentionally. For example, if there are several warning messages that are shown successively by a UI, the user can confirm and close the warning message dialog box by pressing an OK button on the screen, which can cause the user to skip warning messages, either intentionally or unintentionally, by repeated tapping on the screen.

An example embodiment presents a solution to prevent unintentional skipping of warning messages by multiple successive user inputs, while allowing an experienced user to intentionally close the successive warning messages without undue delay in time.

Figure 1:
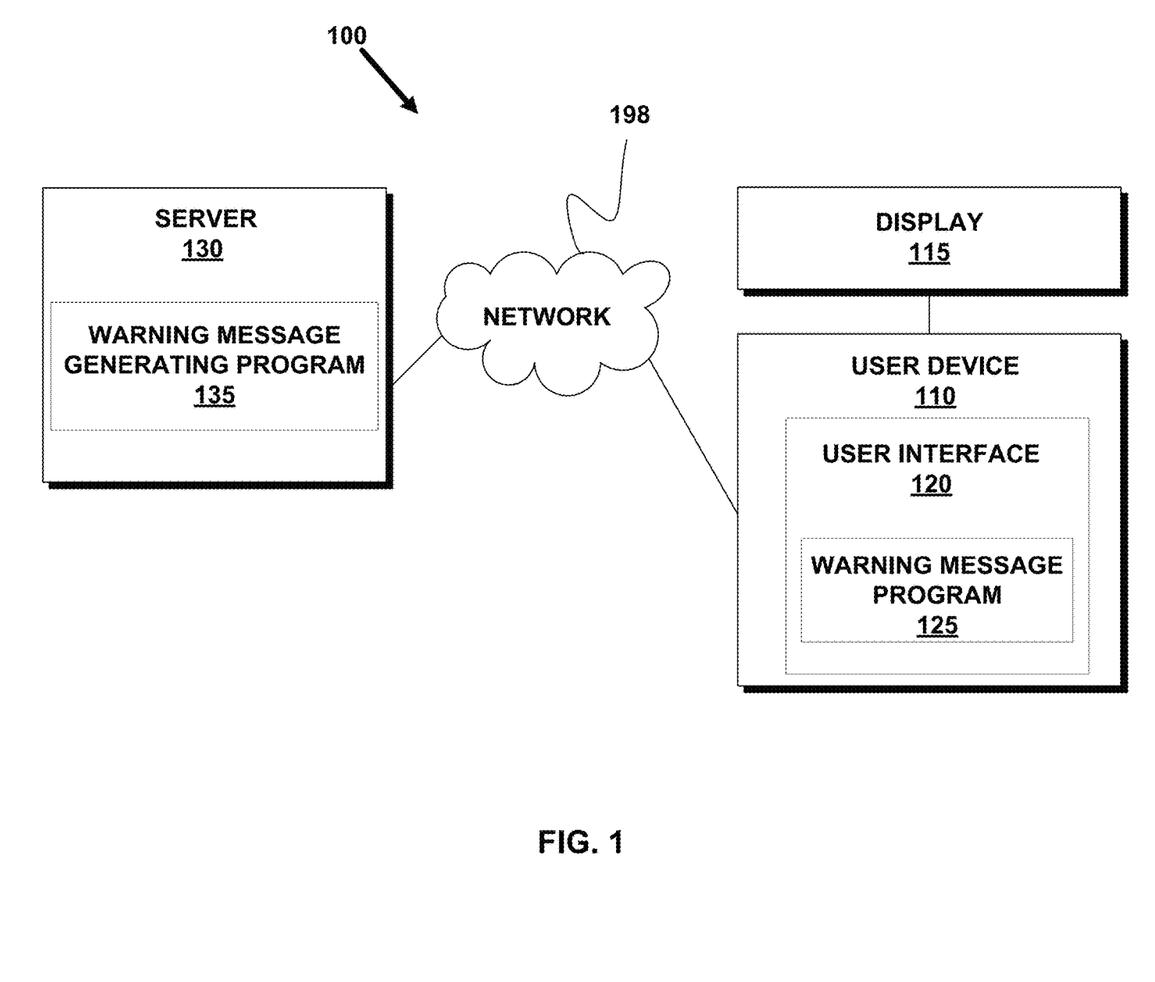
FIG. 1 illustrates an adaptive successive warning message handling system, in accordance with an embodiment of the invention.

FIG. 1 illustrates an adaptive successive warning message handling system 100 that receives warning messages, determines user familiarity with each warning message and displays them to the user while preventing unintentional skipping of the warning message. Prevention of unintentional skipping of the warning message is accomplished by a pre-determined delay in time the user can close the warning message. The delay in time varies according to user familiarity with each warning message. In an example embodiment, adaptive successive warning message handling system 100 comprises server 130 (running warning message generating program 135) and user device 110 (running UI 120 that includes a warning message program 125) connected to display 115, interconnected via network 198.

In accordance with an embodiment of the invention, network 198 is the Internet, representing a worldwide collection of networks and gateways to support communications between devices connected to the Internet. Accordingly, network 198 can include, for example, wired, wireless or fiber optic connections. In other embodiments, network 198 can be implemented as an intranet, a local area network (LAN), or a wide area network (WAN). In general, network 198 can be any combination of connections and protocols that will support communications between server 130 and user device 110.

According to an example embodiment, server 130 represents a platform configured to send and receive data from user device 110 over network 198. For example, server 130 can be a web server, file server, desktop computer, or any other electronic device or computing system capable of sending warning messages over network 198. Although not shown, optionally, server 130 can comprise a cluster of servers. In an example embodiment, server 130 is a computing system that is optimized for the support of multiple network requests related to sending warning messages and receiving feedbacks. In this embodiment, server 130 includes warning message generating program 135 that sends warning messages to user device 110 via network 198.

Warning message generating program 135 operates on server 130, and represents a software program configured to send warning messages to warning message program 125. According to an example embodiment, warning message generating program 135 is a part of a server operating software that formats, sends, and receives feedback related to the warning messages. For example, warning message generating program 135 can be a part of a web server that monitors different security problems and sends warning messages such as, for example, "network connection is unsecure," "your access is not password protected," or "your password will expire in 30 days," to notify the user of user device 110.

According to an example embodiment, user device 110 represents a platform configured to interact with server 130 and receive and display warning messages. For example, user device 110 can be a desktop computer, a notebook, a laptop computer, a tablet computer, a handheld device, a smart-phone, a thin client, or any other electronic device or computing system capable of receiving warning messages and sending feedback to other computing devices, such as server 130, via network 198. In an example embodiment, user device 110 can receive successive warning messages from warning message generating program 135, process them with warning message program 125 and display them using UI 120 on display 115.

Display 115 is an electronic device that is capable of displaying warning messages received from warning message generating program 135, user interface 120 and warning message program 125. According to an example embodiment, display 115 is connected to user 110. In other embodiment, display 115 can be integrated into user device 110. In an example embodiment, display 115 can be a screen, touch screen, television, projector or other device capable of displaying warning messages. In other embodiments, display 115 can be another device capable of presenting warning message content to the user such as, for example, a speaker or other voice or multimedia rendering device. According to an example embodiment, display 115 is controlled by UI 120.

UI 120 is a software program capable of receiving, sending, organizing, and displaying information to a user including information such as, for example, warning messages, text, pictures, graphs, multimedia content and other computer data received from server 130 or stored in user device 110. According to an example embodiment, UI 120 can be a browser or virtual machine capable of presenting information and sending feedback from a user. According to an example embodiment, UI 120 includes warning message program 125. In other embodiment, warning message program 125 can be integrated into UI 120 as a part of UI 120 application programming interface (API).

According to an example embodiment, warning message program 125 is a software program configured to receive and display successive warning messages on the display 115 of user device 110. Warning message program 125 can be either integrated into UI 120 or a standalone program that uses UI 120 functionality via the API.

According to an example embodiment, warning message program 125 receives warning messages, and determines a delay in time prior to displaying a user input GUI object allowing the user to confirm the message was read. The delay can be based on a user familiarity with the warning message. Warning message program 125 can receive warning messages either from server 130, user device 110 or any other computing device connected to network 198 and adopted to send warning messages to warning message program 125. According to an example embodiment, the user is familiar with the warning message if the user has seen the warning message within a pre-determined time frame that can be adjusted in the warning message program 125. Warning message program 125 determines user familiarity with each warning message by accessing and saving data associated with the user and the warning message. In instances when the user is familiar with the warning message, the warning message program 125 displays a user input GUI object, enabling the user to confirm the message was read without delay. In instances when the user is not familiar with the warning message (receives the warning message for the first time or re-receives the warning message after the time frame associated with user familiarity has lapsed), warning message program 125 delays the user input The delay in allowing a user input ensures that the user who is not familiar with the warning message does not provide the user input by mistake to close the warning message on display 115. The operations and functions of warning message program 125 are described in further details below with regard to FIG. 2.

Figure 2:
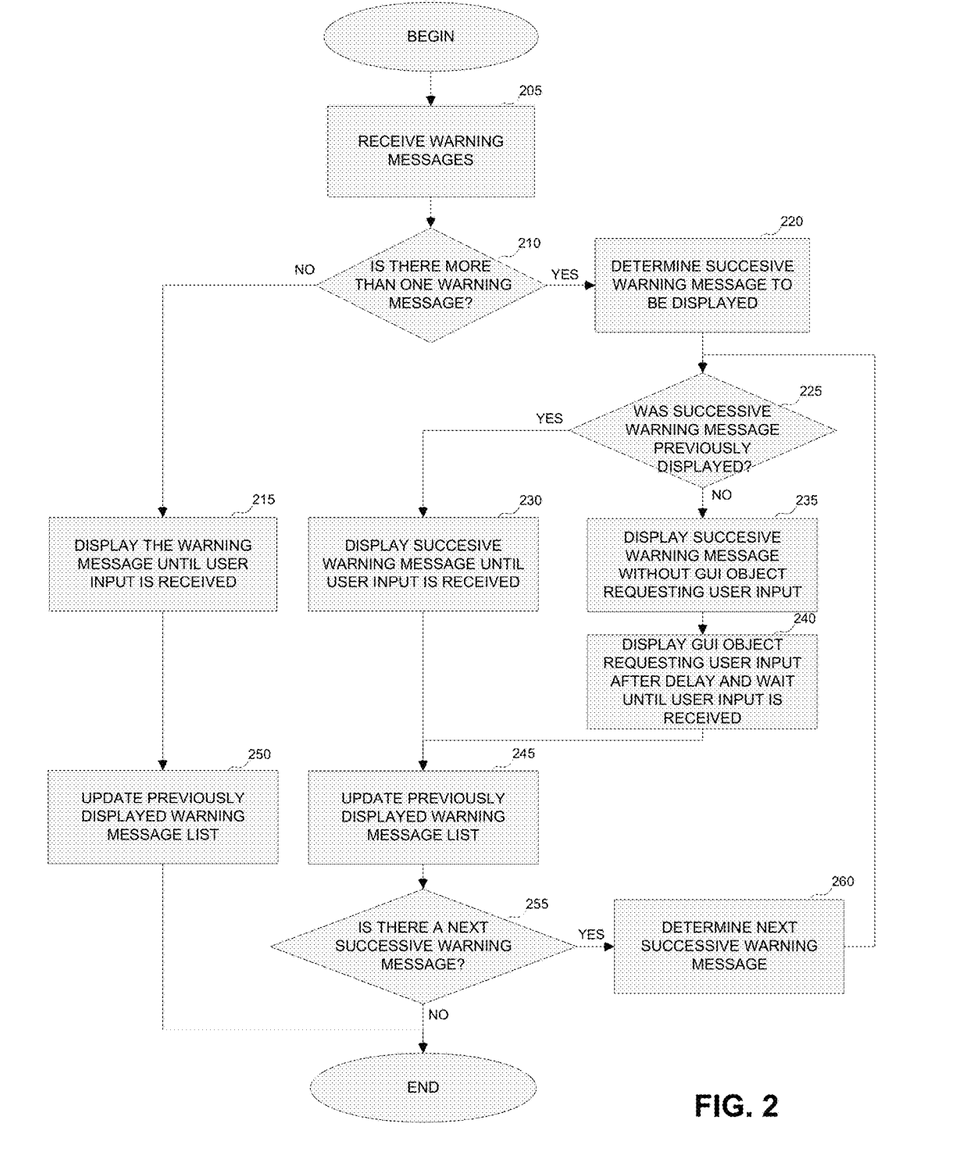
FIG. 2 is a flowchart illustrating operations of a warning message program of FIG. 1, in accordance with an embodiment of the invention.

FIG. 2 is a flowchart illustrating operations of warning message program 125. Referring to step 205, warning message program 125 receives warning messages to be displayed on display 115. According to an example embodiment, warning message program 125 can receive warning messages either from warning message generating program 135 or UI 120 (for example, UI 120 internal warning messages such as errors, crash reports, and warnings). In other embodiments, warning message program 125 can receive warning messages from any software that is capable of transferring warning messages in a corresponding format. In another embodiment, warning message program 125 can run in real time and routinely read warning messages from a dedicated stream of warning messages. In yet another embodiment, warning message program 125 can organize received warning messages according to warning message priority. Warning message priority can be established either by a time and date the warning message was sent or by prioritizing warning messages according to predetermined table or warning message priorities transferred as a part of each warning message.

Referring to decision 210, warning message program 125 checks if there is more than one warning message to be displayed. If there is only one warning message to display, warning message program 125 proceeds to step 215 (decision 210, "NO" branch). If there are more than one warning message, warning message program 125 proceeds to step 220.

Referring to step 215, warning message program 125 displays the warning message until user input is received. When there is only one warning message no time delay to display the user input GUI object is required, therefore warning message program 125 displays the warning message on display 115 with associated user input. User input can be any response received from the user confirming that the user read the warning message. According to an example embodiment, user input is a user interaction with a displayed user input GUI object, such as, for example, using a pointing device to click the OK button displayed at the end of the warning message. For example, pointing device can be a mouse, a touch sensitive display, a body movement recognition device, or a voice recognition device. In another embodiment, user input can be an interaction (by selection such as by touching the screen or pressing a mouse button) and movement with a pointing device by touching, pointing or grabbing of the user input GUI object on the screen through a certain path or any other dynamic interaction of the pointing device with the displayed user input GUI object. In another embodiment, user input can be a dynamic user input GUI object such as predefined movement of the pointing device on the UI with or without interaction with the user input GUI object. For example, a user has to select (by pressing a button) and drag graphical icon with a pointing device from one location on the screen to another location on the screen (swiping) According to an example embodiment, warning message program 125 closes the warning message after user input is received.

Referring to steps 250, warning message program 125 updates previously displayed warning message list. Warning message list is a reference database that warning message program 125 maintains to determine whether the warning message was previously displayed to the user. According to an example embodiment, warning message program 125 updates the reference database each time the warning message is read. According to an example embodiment, warning message program adds a warning message each time it was displayed to the user. In other embodiment, warning message program 125 deletes old entries beyond a predetermined by the user timeframe because the user can forget the content of the message.

Referring to step 220, warning message program 125, determines a successive warning message to be displayed on display 115. Successive warning message is one of the received warning messages (step 205). According to an example embodiment, warning message program 125 can either display warning messages as they are received or arrange warning messages based on a set criteria before displaying the arranged warning messages to the user. Arranging the warning messages can be performed by organizing warning messages in a certain order such as, for example, chronologically by time, date, Last In First Out (LIFO), First In First Out (FIFO), using an internal software priority table, using a predetermined priority number contained in each warning message, or any combination of aforementioned arrangements. According to an example embodiment, warning message program 125 selects a first warning message from the arranged warning messages as a successive warning message to be displayed on display 115.

Referring to decision 225, warning message program 125 checks whether the current successive warning message was previously displayed to the user. According to an example embodiment, warning message program 125 maintains a previously displayed warning message list, using, for example, a reference database, where all the previously displayed warning messages are recorded. The reference database can be stored either on server 130, user device 110, or other computing devices accessible via network 198. According to an example embodiment, warning message program 125, records in the reference database the warning message date, time and warning message content or specific warning message identification number associated with the warning message. In another embodiment, reference database can additionally store identification parameters to assist 125 in identifying which warning messages were previously displayed to a user. Identification parameters can include device or geographic information such as, for example, user identification number, user device 110 TCP/IP number, a MAC address and any other identification parameters. In another embodiment, warning message program 125 can maintain a user reference database for identifying a user by user device 110 identification (MAC address), unique device name, or predetermined user credentials such as a username or an email address. If the current successive warning message was previously displayed to the user (decision 225, "YES" branch), warning message program 125 proceeds to step 230. If the current successive warning message not previously displayed to the user (decision 225, "NO" branch), warning message program 125 proceeds to step 235.

Referring to step 230, warning message program 125 displays the current successive warning message until user input confirming the message was read is received. According to an example embodiment, warning message program 125 displays the current successive warning message on display 115 by using GUI object of UI 120 such as a warning message box and a user input GUI object requesting a user input, such as an OK button. Only after the user input is received, warning message program 125 closes the warning message. User input is an input received from the pointing device corresponding to pre-defined interaction with the user input GUI object. In an example embodiment, the user input can be performed by a user interacting with an OK button GUI object by "pressing" the OK button either with a pointing device, or pressing an Enter key on a keyboard to complete the user input.

Referring to step 235, warning message program 125 displays the current successive warning message without GUI object requesting user input. According to an example embodiment, in order to avoid unintentional closing of the warning message, warning message program 125 displays only the current successive warning message without GUI object requesting user input and the user cannot confirm that the warning message was read. In another embodiment, warning message program 125 can display GUI object requesting user input in an inactive state. For example, the current successive warning message is displayed in the dialog box but the OK button is dimmed, and the user cannot confirm that the warning message was read. In another embodiment, warning message program 125 can display inactive GUI object requesting input with a counter on a side showing the remaining time before the GUI object requesting input will become active. In a further embodiment, warning message program 125 can display a dynamic user input GUI object where either the destination of the final location of the dynamic user input GUI object is not displayed, or all the GUI object is not displayed or displayed in dimmed colors and not allowing to receive user input.

Referring to step 240, after a delay warning message program 125 displays or activates the user input GUI object and waits until corresponding user input is received. In order to avoid unintentional skipping of successive warning message, warning message program 125 displays or activates user input GUI object after a pre-determined delay corresponding to a user familiarity with the successive warning message. In another embodiment, warning message program 125 can display the GUI object requesting user input in a different location of display 115 if the user is not familiar with the successive warning message. According to an example embodiment, warning message program 125 calculates the delay in time according to a size, such as a word count of the current successive warning message. For example, an average reading speed of an average user is 3.5 words per second therefore, if the warning message contains 10 words the delay will be 2.85 seconds. User reading speed can be adjusted for each user for example by requesting from the user to enter the value representing a user reading speed and adding the user reading speed value to the reference database. In other embodiment, warning message program 125 delays the displaying or activation of GUI object requesting user input for a constant predetermined time that can be adjusted by the user.

Referring to steps 245, warning message program 125 updates previously displayed warning message list. Warning message list is a reference database that warning message program 125 maintains to determine whether the warning message was previously displayed to the user. According to an example embodiment, warning message program 125 updates the reference database each time the warning message is read.

Referring to decision 255, warning message program 125 checks if there is an additional successive warning message to be displayed. If there is at least one additional successive warning message to be displayed (decision 255, "YES" branch), warning message program 125 proceeds to step 260. If there are no additional successive warning messages to display (decision 255, "NO" branch) warning message program 125 ends.

Referring to step 260, warning message program 125 determines the next successive warning message from received messages. According to an example embodiment, warning messages are displayed in the order they were received by warning message program 125. In other embodiment, the next warning message can be determined by prioritizing warning messages either by time, date, LIFO, FIFO, internal software priority table, predetermined priority numbers received with each warning message, or any combination of aforementioned methods.

Figure 3:
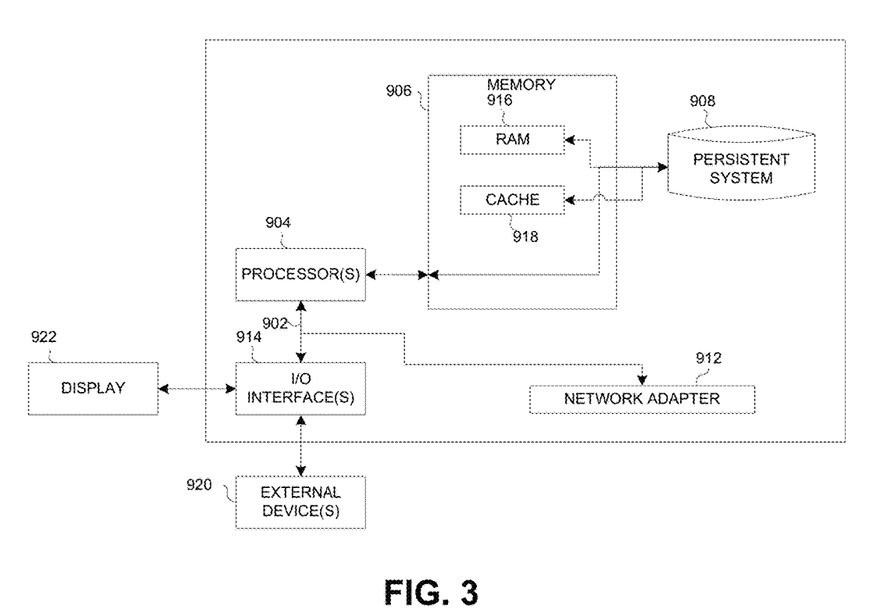
FIG. 3 is a block diagram depicting the hardware components of the adaptive successive warning message handling system of FIG. 1, in accordance with an embodiment of the invention.

FIG. 3 depicts a block diagram of components of the adaptive successive warning message handling system 100, such as user device 110 and server 130, in accordance with an illustrative embodiment of the present invention. It should be appreciated that FIG. 3 provides only an illustration of one implementation and does not imply any limitations with regard to the environments in which different embodiments can be implemented. Many modifications to the depicted environment can be made.

A user device 110 and a server 130 include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

Rendering program 114 and user interface 112 in user device 110, and web page 142 in server 130 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 can also be removable. For example, a removable hard drive can be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network interface cards. Communications unit 912 can provide communications through the use of either or both physical and wireless communications links. Rendering program 114 and user interface 112 in client device 140, and web page 142 in server 130 can be downloaded to persistent storage 908 through communications unit 912.

I/O interface(s) 914 allows for input and output of data with other devices that can be connected to user device 110 or server 130. For example, I/O interface 914 can provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., rendering program 114 and user interface 112 in user device 110, and web page 142 in server 130 can be stored on such portable computer-readable storage media and can be loaded onto persistent storage 908 via I/O interface(s) 914. I/O interface(s) 914 can also connect to a display 922.

Display 922 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for preventing unintentional skipping of a plurality of warning messages, the method comprising:
    receiving the plurality of warning messages for displaying in a successive order;
    determining that a first warning message of the plurality of warning messages was not previously displayed based on determining the first warning message does not match a warning message contained in a previous warning message list, wherein the previous warning message list is a reference database that maintains previously displayed to a user warning messages; and
    based on determining that the first warning message was not previously displayed:
        displaying the first warning message without an active User Interface (UI) object requesting an input from a user, wherein the active UI object requesting the input from the user enables closing of the first warning message; and presenting the active UI object requesting the input from the user after a delay time, wherein presenting the active UI object requesting the input from the user after the delay time comprises:
calculating the delay time based on a size of the first warning message, wherein calculating the delay time based on the size of the first warning message comprises:
determining a word count of the first warning message; and
adjusting the delay time based on the word count; and
presenting the active UI object requesting the input from the user after the delay time.

2. The method of claim 1, further comprising updating the previous warning message list.

3. The method of claim 2, further comprising based on determining that the first warning message was not previously displayed, adding the first warning message to the previous warning message list, wherein the first warning message comprises a list consisting of date, time, and content of the first warning message.

4. The method of claim 2, wherein updating the previous warning message list further comprises:
determining a second warning message was displayed beyond a predetermined timeframe in a past; and
removing the second warning message from the previous warning message list.

5. The method of claim 1, wherein presenting the active UI object requesting the input from the user after the delay time further comprises presenting the active UI object requesting the input from the user, wherein the active UI object requesting the input from the user is a function selected from a group consisting of: a button displayed on a screen, a voice command requesting a verbal response, a graphical icon displayed on a screen requesting interaction with a pointing device.

6. A computer program product for preventing unintentional skipping of a plurality of warning messages, the computer program product comprising:
one or more computer-readable storage devices and program instructions stored on at least one of the one or more tangible storage devices, the program instructions comprising:
program instructions to receive the plurality of warning messages for displaying in a successive order;
program instructions to determine that a first warning message of the plurality of warning messages was not previously displayed based on determining the first warning message does not match a warning message contained in a previous warning message list, wherein the previous warning message list is a reference database that maintains previously displayed to a user warning messages; and
based on determining that the first warning message was not previously displayed:
program instructions to display the first warning message without an active User Interface (UI) object requesting an input from a user, wherein the active UI object requesting the input from the user enables closing of the first warning message; and
program instructions to present the active UI object requesting the input from the user after a delay time, wherein program instructions to present the active UI object requesting the input from the user after the delay time comprises:
program instructions to calculate the delay time based on a size of the first warning message, wherein program instructions to calculate the delay time based on the size of the first warning message comprises:
program instructions to determine a word count of the firstwarning message; and
program instructions to adjust the delay time based on the word count; and
program instructions to present the active UI object requesting the input from the user after the delay time.

7. The computer program product of claim 6, further comprising program instructions to update the previous warning message list.

8. The computer program product of claim 7, further comprising based on determining that the first warning message was not previously displayed, program instructions to add the first warning message to the previous warning message list wherein first warning message comprises a list consisting of date, time, and content of the first warning message.

9. The computer program product of claim 7, wherein program instructions to update the previous warning message list further comprises:
program instructions to determine a second warning message was displayed beyond a predetermined timeframe in a past; and
program instructions to remove the second warning message from the previous warning message list.

10. The computer program product of claim 6, wherein program instructions to present the active UI object requesting the input from the user after the delay time further comprises program instructions to present the active UI object requesting the input from the user, wherein the active UI object requesting the input from the user is a function selected from a group consisting of: a button displayed on a screen, a voice command requesting a verbal response, a graphical icon displayed on a screen requesting interaction with a pointing device.

11. A computer system for preventing unintentional skipping of a plurality of warning messages, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to receive the plurality of warning messages for displaying in a successive order;
program instructions to determine that a first warning message of the plurality of warning messages was not previously displayed based on determining the first warning message does not match a warning message contained in a previous warning message list, wherein the previous warning message list is a reference database that maintains previously displayed to a user warning messages; and
based on determining that the first warning message was not previously displayed:
program instructions to display the first warning message without an active User Interface (UI) object requesting an input from a user, wherein the active UI object requesting the input from the user enables closing of the first warning message; and program instructions to present the active UI object requesting the input from the user after a delay time, wherein program instructions to present the active UI object requesting the input from the user after the delay time comprises:
program instructions to calculate the delay time based on a size of the first warning message, wherein program instructions to calculate the delay time based on the size of the first warning message comprises:
program instructions to determine a word count of the firstwarning message; and
program instructions to adjust the delay time based on the word count; and
program instructions to present the active UI object requesting the input from the user after the delay time.

12. The computer system of claim 11, further comprising program instructions to update the previous warning message list.

13. The computer system of claim 12, further comprising based on determining that the first warning message was not previously displayed, program instructions to add the first warning message to the previous warning message list wherein first warning message comprises a list consisting of date, time, and content of the first warning message.

14. The computer system of claim 12, wherein program instructions to update the previous warning message list further comprises:
program instructions to determine a second warning message was displayed beyond a predetermined timeframe in a past; and
program instructions to remove the second warning message from the previous warningmessage list.

15. The computer system of claim 11, wherein program instructions to present the active UI object requesting the input from the user after the delay time further comprises program instructions to present the active UI object requesting the input from the user, wherein the active UI object requesting the input from the user is a function selected from a group consisting of: a button displayed on a screen, a voice command requesting a verbal response, a graphical icon displayed on a screen requesting interaction with a pointing device.

* * * * *